July 25, 1961
H. A. BIRKNESS
2,993,366
CONDUCTOMETRIC CORROSION TEST PROBE WITH
REPLACEABLE TEST SPECIMEN COMPONENTS
Filed July 2, 1959
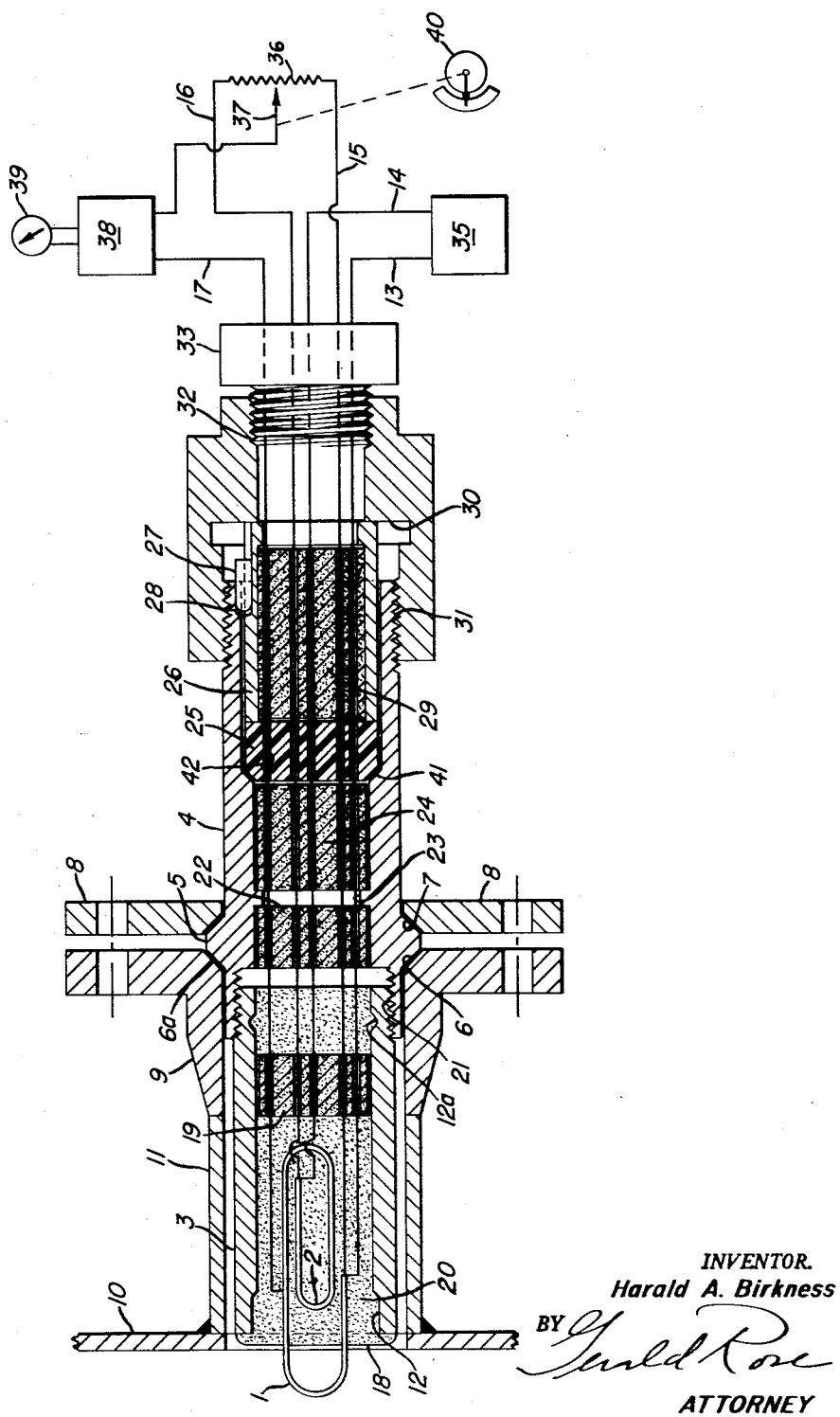
INVENTOR.
Harald A. Birkness
BY
ATTORNEY : 2,993,366
Patented July 25, 1961

2,993,366
CONDUCTOMETRIC CORROSION TEST PROBE WITH REPLACEABLE TEST SPECIMEN COMPONENTS

Harald A. Birkness, Homewood, Ill., assignor to Standard Oil Company, Chicago, Ill., a corporation of Indiana
Filed July 2, 1959, Ser. No. 824,652
2 Claims. (Cl. 73—86)

This invention relates to apparatus for measuring rates of corrosion and erosion. More particularly it relates to an improved test proble assembly for use in making electrical measurement of such rates, which assembly features replaceability of expendable components.

Heretofore an electrical resistance system has been developed which directly measures loss of metal from a corrosion test sample or specimen exposed to a corrosive substance within process equipment, pipelines, and the like. Since the test specimen experiences a reduction in thickness caused by corrosion, the decrease in its electrical conductivity is a direct measure of metal loss. By directly measuring the increase in resistance of such specimens, the rate of corrosion experienced by the equipment itself can be determined quickly and accurately. Likewise the system may be used for evaluating the effectiveness of chemical corrosion inhibitors.

The corrosion rate determinations may be made automatically or manually, either in a periodic or continuous manner, in terms of resistance of the specimen. Conventional resistance determinations based on simple electrical relationships are easily adapted to this purpose.

In conducting corrosion rate measurements in process equipment and the like, the corrosion test specimen is physically positioned within the equipment. Consequently, it is evident that the probes carrying the specimens must be of such durability that they may withstand all mechanical and thermal shocks to which the equipment itself may be exposed. Also, many applications require test probes which are capable of withstanding pressures on the order of 500 p.s.i.g. or higher, and temperatures in excess of several hundred degrees F. Moreover, the test probes should be low in cost.

Accordingly, a primary object of the present invention is to provide an improved test probe assembly adapted for use in conductometric corrosion test series. A further object is to provide a test probe capable of withstanding high pressures and temperatures. A special object is to provide a test probe assembly which features renewability or replaceability of the corrosion test sample portion. Still another object is to provide a probe assembly having outstanding mechanical durability. Other and more particular objects of the invention will become apparent as the description of this invention proceeds.

Briefly, according to the invention, a test probe assembly is provided which is made up in two major portions. The first, or replaceable, portion is a tube-like member carrying the corrosion specimen at one end thereof, and having suitable electric lead wires passing through a central bore. The second, or permanent, portion is provided with a collar or equivalent surface adapted for attachment to a vessel fitting for pressure-tight sealing, and contains, in a relatively cool portion thereof, a deformable plug having lead wire-receiving apertures passing through the plug. Thus, by applying a deforming pressure to the deformable plug, the plug effectuates a pressure-tight seal around the lead wires to the corrosion specimen, and assures a safe, yet replaceable, installation.

The invention will be described in considerable detail in the ensuing portions of this specification, when read in conjunction with the single drawing attached hereto. This drawing shows a preferred embodiment of the invention as it may be installed for measurement of corrosion in a refinery pressure vessel. The drawing also shows, in schematic form, an electrical circuit suitable for automatically determining the corrosion rate of a test specimen, and hence the corrosion rate of the vessel itself.

Turning now to the drawing, the probe assembly comprises a replaceable section including an elongated tubular pipe or nipple 3 which is received into the permanent portion or probe body member 4 by means of threads 21. Tubular nipple 3 carries corrosion specimen 1, protruding from the end thereof, and may also carry a second specimen 2, hereinafter termed the reference specimen, which has a similar temperature coefficient of resistance to that of corrosion specimen 1, and which may be employed in compensating for the effects of temperature on the resistance of the test specimen 1. Reference specimen 2 is protected, either by suitable coating or by encasement within tubular nipple 3, against corrosion from the atmosphere of refinery vessel 10.

Corrosion specimen 1 is an elongated electrically conducting metal sample which is exposed to the corrodant and which, by decreasing its conductivity as a result of metal loss caused by corrosion, affords a direct measurement of corrosion rate. Physically, corrosion test specimen 1 may be in the form of a strip, a wire, a tube, or other form presenting a readily determinable surface area. The choice of cross-sectional configuration depends largely on the expected corrosion rate and on the relative need for accurate corrosion rate measurements. For example, a thin strip having dimensions of, say, about 2" long, about ⅛" wide, and about 1 mil thick is very suitable for either short-term exposure to a very corrosive medium or long-term exposure to a less corrosive material since any decrease in its thickness is accompanied by a proportionally large decrease in its conductivity. On the other hand, a test specimen composed of round solid wire of about 1/16" in diameter exhibits a relatively small decrease in conductivity with corrosion inasmuch as its surface area is small with reference to its cross-sectional area. Accordingly, test specimens composed of round wires having a fairly large diameter, e.g. 1/32 to ⅛", are more suitable for long-term installations where the specimen is to remain in place for periods of months or longer. Furthermore, wire or tubular test specimens 1 afford superior mechanical strength which is of importance when the probe assembly is to be exposed to fluids moving at high velocities.

In the embodiment shown in the attached drawing, a reference specimen 2 is positioned near test specimen 1 so as to experience the same temperatures as the test specimen. Reference specimen 2 is protected from corrosion by suitable encasement or by covering with corrosion resistant materials, etc., and is made of an electrically conducting material which exhibits a similar temperature coefficient of resistance to that of corrosion specimen 1. Thus, while the absolute resistance of reference specimen 1 is affected by temperature changes, the ratio of its resistance to that of specimen 2 (absent the effect of corrosion) will remain substantially constant notwithstanding temperature changes during measurement. Most desirably, reference specimen 2 and corrosion specimen 1 are made of the same material, and for optimum correspondence should be adjacent portions of the same wire, tube, or strip. A suitable system for performing conductometric corrosion rates using a temperature compensated circuit will be described hereinafter.

Corrosion specimen 1 is carried by, and protrudes from, tubular nipple 3. Nipple 3 may be a section of alloy steel pipe, having an axial bore passing through its length for the purpose of containing and protecting lead wires 13, 14, 15, 16 and 17. These lead wires extend from the reference specimen 2 and the test specimen 1. Since it frequently is desirable to employ the probe assembly at temperatures well in excess of those at which common flexible insulating materials are suitable, the lead wires are maintained in spaced and insulated relationship by means of one or more ceramic insulators 19 placed within the bore of tubular nipple 3. These insulators 19 have apertures to receive the respective lead wires. Additional mechanical and electrical protection may be afforded by potting the wires and insulators 19 with a suitable sealing cement capable of withstanding the surface temperatures and pressures. Potting cements 20 such as the sodium silicate "Sauereisen" cements or the epoxy resins are useful in particular instances, although numerous other electrically insulating and thermally stable materials are well known in the art.

In order to afford mechanical strength for the installation of potting cement 20 and ceramic insulators 19, one or more recesses 12a or counterbores 12 may be provided in the bore of tubular nipple 3. These counterbores or recesses become filled with potting cement 20 and thus resist longitudinal pressures.

The inner end 18, i.e. that which extends into vessel 10, of tubular nipple 3 may either be sealed with the potting cement 20 used in the balance of the tubular nipple 3, or may employ a suitable plug, of, for example, a ceramic material such as lava or a temperature-resistant organic plastic such as polytetrafluoroethylene mixed with asbestos fibers. This seal, however, does not and need not withstand elevated pressures inasmuch as pressure sealing is effected by other means. Tubular nipple 3 is rigidly but replaceably secured to the permanent or probe body section 4 by means such as threads 21.

Probe body 4 may be made of stainless steel bar stock which has been machined to include a collar 7 and an axial bore having a tapered shoulder 41, the larger diameter of which receives deformable plug. The outer end of probe body 4 is threaded to engage cap 32, and the shank between the threaded portion and collar 7 may be machined with flats, not shown, to facilitate applying a backing wrench when tightening cap 32.

The bore of probe body 4 is of such size as to accommodate ceramic insulators 22 and 24 which, in a manner similar to insulator 19 and tubular nipple 3, space and insulate the several lead wires. Shoulder 23 may be employed to position insulator 24 in the outer portion of probe body 4 and form a rigid surface upon which deformable plug 25 abuts.

Pressure sealing of the instant probe assembly is accomplished by means of deformable plug 25, which is made of a deformable and electrically insulating material such as compressed talc, polytetrafluoroethylene, or lava. Plug 25 has a plurality of apertures 42 passing through it to receive the lead wires from specimens 1 and 2. As further shown in the drawing, both deformable plug 25 and the bore of probe body 4 have a tapered surface 41; when pressure is applied to deformable plug 25 the resolved radial forces tend to restrict apertures 42 and thus seal the lead wires, as well as sealing the plug 25 with surface 41 of probe body 4.

Sealing pressure is applied to deformable plug 25 by means of gland follower 26 and rotatable cap 32. Gland follower 26 may be made of a rigid material such as steel, and abuts against rear surface 30 of cap 32. Thus whenever cap 32 is rotated with respect to probe body 4, screwed portion 31 advances cap 32, and hence applies longitudinal pressure on gland follower 26 by means of surface 30. Electrical insulation may be maintained by disposing an insulator 29 in the bore of gland follower 26. In order to avoid a rotating action of gland follower 26 with respect to deformable plug 25, which would tend to shear the lead wires, keyway slot 28 is milled in adjacent portions of probe body member 4 and gland follower 26 and a suitable key 27 is inserted. Thus, the rotation of cap 32 cannot rotate gland follower 26.

A conventional terminal 33 may be attached to the outer end of gland follower 26 to provide means for connecting the lead wires into an electrical measuring circuit.

The test probe assembly is rigidly but removably mounted by means of integral collar 5 which has a spherical forward surface 6 and a spherical or flat conical flat surface 7, the collar 5 extending around the periphery of probe body 4. Equivalent sealing surfaces for collar 5, e.g. threads and the like, may be employed. Spherical surface 6 meets in pressure-tight sealing relationship with a corresponding spherical surface 6a on flange 9, which is connected to vessel 10 by way of nozzle 11. In back of collar 5 and abutting against surface 7, flange 8 is disposed. Thus tightening of suitable bolts in the respective flanges 8 and 9 causes spherical sealing surface 6 to become pressure-tight with surface 6a of flange 9 and thus prevent pressure leakage.

When installing or replacing the test probe example, flanges 8 and 9 need only be spread to remove the entire probe assembly. In order to replace tubular nipple 3 with its associated reference specimen 2, cap 32 may be removed and then tubular nipple 3 simply screwed off. With a new tubular nipple 3 installed, the assembly of tubular nipple 3 and probe body 4 can be easily made and the complete probe assembly replaced in vessel 10. Alternatively, nipple 3 may merely be screwed off while leaving body 4 in place.

A particularly advantageous feature of the present invention is that deformable plug 25 is disposed externally of vessel 10, and hence is outside the atmosphere which may exist in vessel 10. Thus it is not exposed to severe thermal conditions. Furthermore, the seal provided by deformable plug 25 is maintained independent of possible complete corrosion of specimens 1 and 2 and of a substantial proportion of their lead wires.

A suitable electrical circuit for making corrosion rate determinations is shown in the drawing as being a bridge-type circuit wherein the reference specimen 2 and test specimen 1 comprise arms of an electrical circuit. This circuit permits the determination of corrosion rate independent of temperature effects on the resistance of either specimen. A current from source 35 is applied by current leads 13 and 14 to the probe assembly. The test specimen 1 is exposed to the corrosive system of vessel 10. Potential-measuring leads 15 and 16 are connected to the potentiometer 36; the wiper 37 of slide wire 37 is connected to lead 17 through the amplifier 38; the output of amplifier 38 is fed to null detector 39. The slide wire wiper 37, mechanically linked to the corrosion indicating dial 40, is adjusted to attain the null reading at 39. As corrosion takes place, the conductivity of corrosion specimen 1 decreases (and the resistance increases), and slide wire wiper 37 is adjusted to retain a null reading on detector 39. The movement of indicating dial 40 necessary to reposition slide wire wiper 37 is directly related to the change in conductivity, and hence to the rate of corrosion.

From the foregoing presentation, it is clear that the objects of the present invention have been fully satisfied, and a conductometric corrosion test probe assembly has been provided which features low-cost construction and extreme ruggedness and durability in service. Furthermore, the corrosion test specimen is easily made and readily replaceable.

Although the invention has been described with reference to preferred embodiments thereof, it is to be understood that these are by way of illustration only. Accordingly, it is contemplated that modifications and variations can be made in the apparatus by those skilled in the art in light of my description without departing from the spirit and broad scope of the invention.

I claim:

1. A conductometric corrosion test probe assembly suitable for making corrosion tests at high pressures and temperatures comprising: a test probe body having a tapered-shouldered bore extending therethrough, a portion of said bore being threaded; a flanged collar on said body adapted to connect with a flange on a vessel; a conductometric corrosion test specimen and lead wires extending therefrom; a reference specimen having a similar temperature coefficient of resistance to said corrosion test specimen and having lead wires extending from said reference specimen; a replaceable portion comprising a tubular nipple threadably received in the bore of said sample probe body, said nipple carrying said corrosion test specimen, said reference specimen, and the lead wires, the lead wires being in spaced insulated relationship; a potting material sealing said specimens and said lead wires in said nipple; a deformable plug having lead wire-receiving apertures, said plug being disposed within the bore of said probe body and contacting the tapered-shouldered portion thereof; follower means adapted for applying pressure on said deformable plug whereby to establish pressure sealing relationship with said probe body and with said lead wire; and means including a cap threadably connected to said probe body for applying sealing pressure to said follower means and said deformable plug.

2. The test probe assembly of claim 1 wherein said follower means is non-rotatably disposed in said probe body.

References Cited in the file of this patent

UNITED STATES PATENTS

| | | |
|---|---|---|
| 2,131,066 | Obermaier | Sept. 27, 1938 |
| 2,864,252 | Schaschl | Dec. 16, 1958 |
| 2,928,726 | Oberly | Mar. 15, 1960 |